United States Patent [19]

Kackos

[11] 4,335,075
[45] Jun. 15, 1982

[54] DOOR SEAL FOR STERILIZER

[75] Inventor: Edward M. Kackos, Belmar, N.J.

[73] Assignee: Vernitron Corporation, Lake Success, N.Y.

[21] Appl. No.: 218,934

[22] Filed: Dec. 22, 1980

[51] Int. Cl.³ .......................... A61L 2/06; A61L 2/26; B65D 53/02

[52] U.S. Cl. ..................................... 422/112; 49/477; 49/492; 220/232; 422/49; 422/296

[58] Field of Search ................ 422/49, 296, 310, 242, 422/295, 112; 220/232; 49/477, 492

[56] References Cited

U.S. PATENT DOCUMENTS

| | | | |
|---|---|---|---|
| 3,059,292 | 10/1962 | Harris | 49/492 |
| 3,139,784 | 7/1964 | Moorman | 49/492 X |
| 3,178,779 | 4/1965 | Clark et al. | 49/477 |
| 3,359,687 | 12/1967 | Wallace | 49/477 |
| 3,488,142 | 1/1970 | Cooper | 422/295 X |
| 4,228,135 | 10/1980 | Wolff | 422/296 |

FOREIGN PATENT DOCUMENTS

| | | | |
|---|---|---|---|
| 1046229 | 1/1979 | Canada | 422/296 |
| 562306 | 8/1977 | U.S.S.R. | 422/296 |

*Primary Examiner*—Barry S. Richman

*Attorney, Agent, or Firm*—Edward H. Loveman

[57] ABSTRACT

Sealing means for maintaining a seal between a closed door of a sterilizer and a wall framing an opening into a sterilizer chamber, comprising an endless ring having elastic walls with an internal partition dividing the ring into two independently inflatable, expansible channels. A tube secured to a wall of the ring opens into each of the channels respectively, for independently inflating the channels. Elastic studs with enlarged heads are secured to one side of the ring for detachably engaging in holes in the open wall of the chamber. A pneumatic circuit including a source of compressed air may be connected to the two tubes and provided with a two-way valve for inflating either one of the two channels. A pressure responsive switch and solenoid may be operatively connected to one of the tubes and valve for closing off the source of compressed air from one channel automatically when pressure falls below a predetermined magnitude, and for supplying compressed air to the other channel to keep the seal between the door and wall of the sterilizer chamber. An alarm such as a lamp may be operatively connected to the pneumatic circuit to indicate automatically that one channel has become deflated and the other channel inflated.

4 Claims, 8 Drawing Figures

DOOR SEAL FOR STERILIZER

This invention relates to a seal construction for a door of a sterilizing chamber, and more particularly concerns an improved inflatable seal for a door of such a sterilizer chamber.

Door seals of various types for sterilizer chambers are well known and have been widely used. For example, in U.S. Pat. No. 4,228,135, there is described a sterilizer chamber having a door sealed by a solid flexible ring applied to the rear side of a sterilizer door by a separate inflatable ring. In the conventional sterilizer, the door is restrained against being "blown off" by steam under high pressure in the sterilizer by various mechanical means, such as shown in U.S. Pat. No. 4,228,135, mentioned above. The door seal is critical to successful operation of the sterilizer, and presents special problems. Sometimes the door seal is cut or pierced by sharp instruments in the sterilizer or by fragments of glass objects which break in the sterilizer. When this occurs the steam under pressure is discharged from the sterilizer through the cut seal, rendering the sterilization process inoperative. Occurence of such an accident at a time when there is high demand for sterilizer output such as during surgical operations, causes great inconvenience. It is therefore desirable to provide a door seal which is "fail safe" and allows a sterilization cycle to be completed by effectively sealing the sterilizer door even though the door seal has been perforated, cut, or damaged.

According to the invention, there is provided a novel flexible sealing ring for a sterilizer chamber door. The ring has two independently inflatable channels connected to a pneumatic circuit. Only one channel at a time is inflated to effect a perfect seal of the sterilizer door. If the wall of the inflated channel should be cut or perforated, the other channel is automatically inflated by the pneumatic circuit to maintain the seal of the door. This permits the sterilization cycle to be completed. After the cycle is completed and the door is opened, the sealing ring may be quickly and easily removed and replaced with another one.

It is therefore a principal object of the present invention to provide a sterilizer door seal construction which is effective and "fail safe".

Another object of the present invention is to provide a sterilizer door seal having two inflatable channels, one channel being inflated, while the deflated channel serves as a "back-up" seal in the event of failure of the inflated channel. p A further object of the present invention is to provide a sterilizer door seal which may be quickly and easily installed and removed without requiring any holding plates, bolts, screws, and the like, and without requiring use of tools to install and replace the door seal.

These and other objects and many of the attendant advantages of this invention will be readily appreciated as the same becomes better understood by reference to the following detailed description when considered in connection with the accompanying drawings in which.

Figure 1:
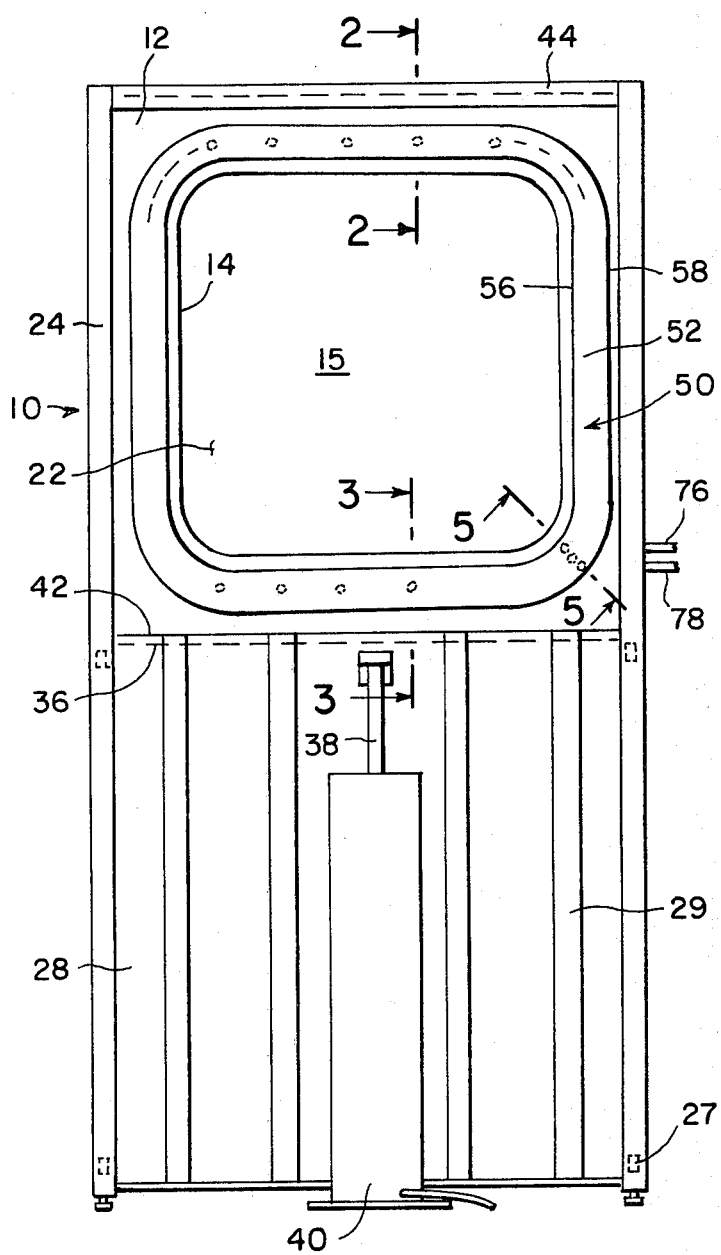
FIG. 1 is a front elevational view of a sterilizer equipped with a door seal embodying the invention, the door of the sterilizer being shown in open position.
Figure 2:
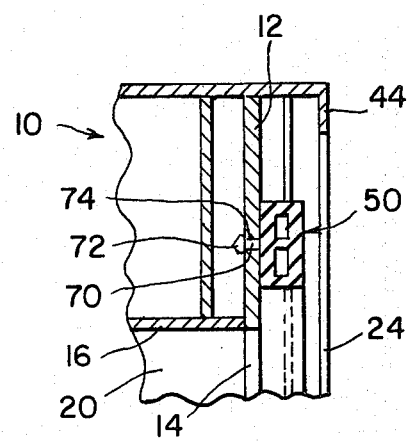
FIG. 2 is an enlarged fragmentary vertical sectional view taken along line 2—2 of FIG. 1.
Figure 3:
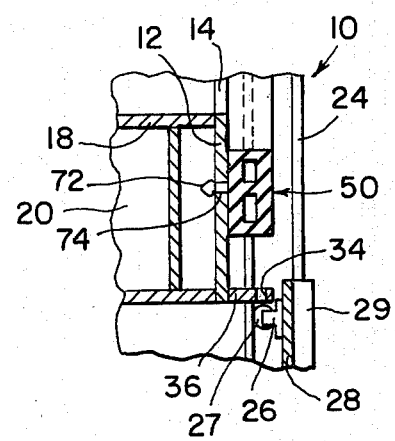
FIG. 3 is an enlarged fragmentary vertical sectional view taken along line 3—3 of FIG. 1.
Figure 4:
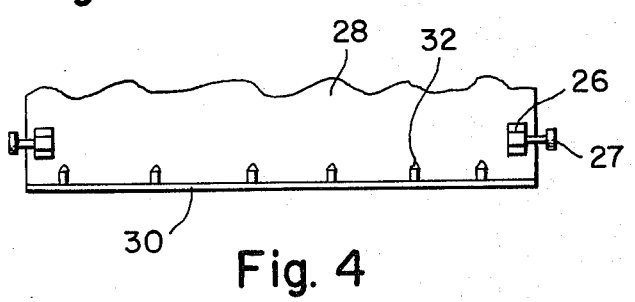
FIG. 4 is a fragmentary rear elevational view of the lower part of the sterilizer door per se.

Referring now to the drawings wherein like reference characters designate like or corresponding parts throughout, there is illustrated in FIGS. 1, 2, 3, a sterilizer generally designated as reference numeral 10 having front wall 12 framing an opening 14 providing communication with the interior of a sterilizer chamber 15. The chamber 15 is enclosed by spaced double walls 16, 18 at the top and bottom respectively, double side walls 20 and rear walls 22. The sterilizer is elevated by a framework (not shown). At the front of the sterilizer 10 are two laterally spaced channel bars 24 defining vertical tracks in which ride rollers 27 carried by brackets 26 located at four corners of a vertically slidable rectangular door 28; see FIG. 4. The door 28 is reinforced by bars 29. At the bottom of the door 28 is a rearwardly extending horizontal flange 30 carrying spaced pins 32 which engage in corresponding spaced holes 34 in bottom flange 36 of the sterilizer chamber 15, when the door 28 is in elevated closed position; see FIG. 3. The door 28 is shown in lowered position in FIG. 1. The door 28 is elevated by an axially vertical shaft 38 of a hydraulic cylinder 40. When the door 28 is fully elevated its upper edge 42 engages behind a horizontal depending flange 44 at the top of the sterilizer chamber 15. To the extent described, the sterilizer is of conventional construction, and further structural details of this particular type of sterilizer are described in U.S. Pat. No. 4,228,135 above mentioned.

Now according to the invention, there is provided a hollow sterilizer sealing ring 50 shown in FIGS. 1, 2, 3, 5, and 6. The ring 50 is made of elastic silicone material adapted to withstand the elevated temperatures and high pressures to which it is subjected during a sterilization cycle. The ring 50 is generally rectangular in cross section with a front wall 52, a rear wall 54 and an inner wall 56 and an outer wall 58. Inside the hollow ring 50 is a median partition 60 dividing the ring 50 into two endless channels 64, 66. Integrally formed with the rear wall 54 of the ring 50 is a multiplicity of spaced mushroom shaped elastic studs 68, having cylindrical elastic necks, 70 and heads 72. The studs 68 engage in correspondingly located spaced holes 74 located in the open front wall 12 of the sterilizer chamber 15; see FIGS. 3, 5, 6, 7. The studs 68 make it possible to install the sterilizer sealing ring 60 by finger pressure to engage the heads 72 just inside the front wall 12. The stud heads 72 have tapered ends and tapered sides to enable ready insertion into the holes 74 and quick removal therefrom.

Figure 5:
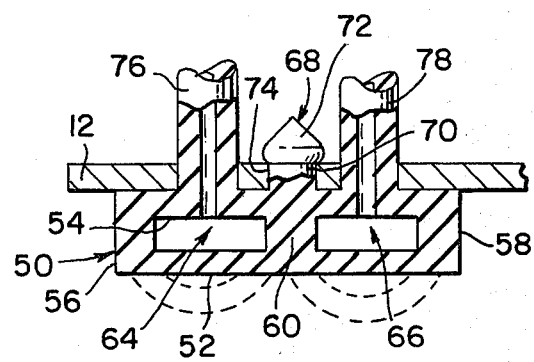
FIG. 5 is an enlarged fragmentary oblique sectional view taken along line 5—5 of FIG. 1, with sterilizer sealing ring shown in deflated condition.
Figure 6:
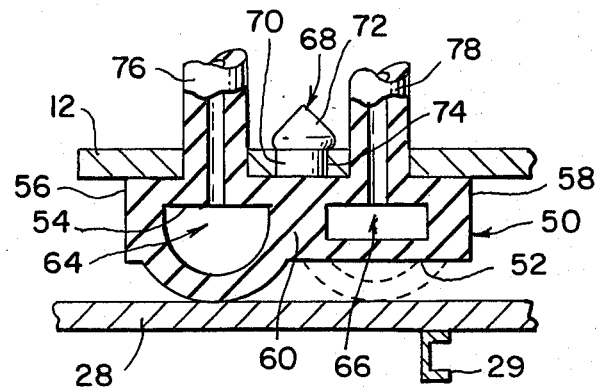
FIG. 6 is a fragmentary sectional view similar to FIG. 5, showing one sterilizer channel of the sterilizer sealing ring inflated and sealing the closed door of the sterilizer.
Figure 7:
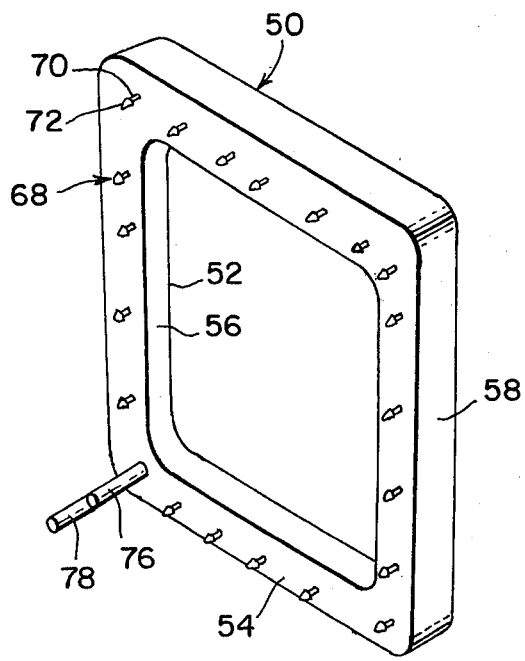
FIG. 7 is an isometric rear view of the sterilizer sealing ring per se.

At the lower left hand corner of sealing ring 50 as viewed from the rear (FIG. 7) are two integral tubes 76, 78 between which is a stud 68, as illustrated in FIGS. 5, and 6. The tubes 76, 78 communicate with channels 64, and 66 respectively, and serve to pass compressed air into the channels for inflation thereof.

Figure 8:
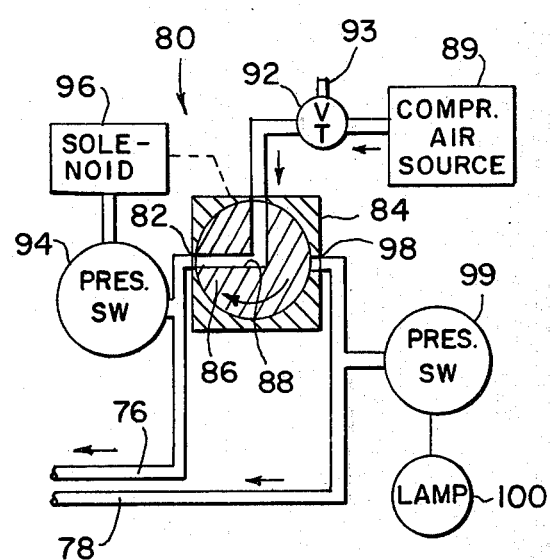
FIG. 8 is a diagram of a pneumatic circuit employed in association with the sterilizer sealing ring.

FIG. 8 shows a pneumatic circuit 80 which may be used to inflate the channels 64, 66 in the ring 50. The tube 76 is connected to one opening 82 in a two-way valve 84. The valve 84 has a rotatable core 86 with an L-shaped passage 88. The tube 76 communicates with a compressed air source 89 via a throttle valve 92 and the passage 88 in the core 86. Connected laterally to the tube 76 is a pressure switch 94. When the pressure in the tube 76 falls below a certain predetermined pressure such as caused by perforation of a wall of the inflated channel 64, the switch 94 is closed to actuate a solenoid 96, which is connected to the rotary core 86 and turns it clockwise. The tube 78 is connected to an opening 98 in the valve 84. Connected laterally to the tube 78 is a pressure responsive switch 99 which operates to turn on an alarm lamp 100 when air pressure inflates the channel 66 via the tube 78. When the solenoid 96 is actuated, the valve core 86 turns to close the valve opening 82 and provided direct communication between the tuve 78 and the compressed air source 80 via the valve 92 and the valve passage 88.

By the arrangement of the pneumatic circuit described manually opening valve 92 initially inflates channel 64 as shown in FIG. 6 thereby expanding the front wall 52 to seal elevated, closed door 28. If one of the outer walls of the channel 64 is perforated while the channel 64 is inflated, the channel 64 will deflate when the channel is deflating the pressure in the tube 76 will fall, automatically actuating the switch 94 and the solenoid 96, to cause the valve core 86 to turn and open a pneumatic path through the tube 78. The channel 66 will be automatically inflated as indicated by dot-dash lines in FIG. 6. By this arrangement the pressure seal 50 between the front wall 12 of the sterilizer chamber 15 and the door 28 will be maintained. After the sterilization cycle is completed, the valve 92 may be set to vent to atmosphere at an outlet 93 causing the inflated channel to deflate breaking the seal 50 at door 28. Then the door may be hydraulically lowered. The damaged sealing ring may be quickly pulled off the front wall 12 of the sterilizer and a new sealing ring may be installed. It will be noted that no tools are necessary to remove and replace the ring 50 so that the time when the sterilizer is out of service for replacement of a sterilizer sealing ring is minimized. It will also be observed that operation of the sealing system is "fail safe" since failure of one inflated channel automatically causes inflation of the "back up" or reserve channel. The alarm lamp 100 goes on to signal the operator of the sterilizer that one channel as failed and that the reserve channel is inflated, so that the sealing ring should be replaced at the end of the current sterilization cycle. If desired the sealing ring may have a third channel provided with its own inflation tube and connected in the pneumatic circuit to inflate if the two other channels fail.

It should be understood that the foregoing relates to only preferred embodiment of the invention which has been by way of example only, and that it is intended to cover all changes and modifications of the example of the invention herein chosen for the purposes of the disclosure, which do not constitute departures from the spirit and scope of the invention.

What is claimed is:

1. Door sealing means for a sterilizer having an open wall providing communication with an interior chamber closable by a door, and means for retaining said door in place at said wall to close said chamber, comprising:

an endless, hollow sealing ring having outer elastic walls;

a partition inside said ring dividing said ring into two separate, endless, inflatable channels expansible to seal said door to said wall of said sterilizer;

two flexible tubes integral with said ring and communicating with said channels respectively;

quickly detachable attachment means on one of said outer walls for attaching said ring to said open wall of said sterilizer;

a source of compressed air;

valve means having two outlets alternately providing communication between said source of compressed air, and said channels respectively to inflate one channel at a time; and pressure responsive means arranged to actuate said valve means to cut off communication between said source of compressed air and one of said two channels automatically when pressure therein falls below a certain predetermined magnitude, and to provide communication between said source of compressed air and the other of said two channels automatically to inflate the same, for maintaining said seal between said door and said wall of said sterilizer.

2. Door sealing means as defined in claim 1, further comprising alarm means operatively connected in said pneumatic circuit for indicating automatically that said one channel is deflated and said other channel is inflated.

3. Door sealing means as defined in claim 1, wherein said attachment means comprises spaced studs on one of said outer walls of said ring and adapted to engage in spaced holes in said wall of said sterilizer.

4. Door sealing means as defined in claim 3, wherein said studs have enlarged, flexible, elastic heads and narrow necks, so that said studs may be quickly engaged in and removed from said holes in said wall of said sterilizer.

* * * * *